(12) United States Patent
Djermester

(10) Patent No.: US 10,549,605 B2
(45) Date of Patent: Feb. 4, 2020

(54) HEATING SYSTEM AND METHOD FOR HEATING A VEHICLE INTERIOR OF A VEHICLE HAVING AN INTERNAL COMBUSTION ENGINE

(71) Applicant: AUDI AG, Ingolstadt (DE)

(72) Inventor: Andreas Djermester, München (DE)

(73) Assignee: Audi AG, Ingolstadt (DE)

( * ) Notice: Subject to any disclaimer, the term of this patent is extended or adjusted under 35 U.S.C. 154(b) by 1088 days.

(21) Appl. No.: 14/783,205

(22) PCT Filed: Apr. 2, 2014

(86) PCT No.: PCT/EP2014/000876
§ 371 (c)(1),
(2) Date: Oct. 8, 2015

(87) PCT Pub. No.: WO2014/166607
PCT Pub. Date: Oct. 16, 2014

(65) Prior Publication Data
US 2016/0068043 A1 Mar. 10, 2016

(30) Foreign Application Priority Data
Apr. 10, 2013 (DE) .................. 10 2013 006 155

(51) Int. Cl.
*B60H 1/03* (2006.01)
*B60H 1/00* (2006.01)
*B60H 1/22* (2006.01)

(52) U.S. Cl.
CPC ............. *B60H 1/034* (2013.01); *B60H 1/032* (2013.01); *B60H 2001/00928* (2013.01); *B60H 2001/2256* (2013.01)

(58) Field of Classification Search
CPC .......... B60H 1/03; B60H 1/032; B60H 1/034; B60H 2001/00928; B60H 2001/2256
See application file for complete search history.

(56) References Cited

U.S. PATENT DOCUMENTS

| 5,899,086 A * | 5/1999 | Noda | B60H 1/00914 62/244 |
| 6,178,928 B1 * | 1/2001 | Corriveau | F01P 7/048 123/41.12 |
| 6,454,180 B2 * | 9/2002 | Matsunaga | B60H 1/00485 165/41 |

(Continued)

FOREIGN PATENT DOCUMENTS

| DE | 199 01 807 | 7/2000 |
| DE | 102 34 087 | 2/2004 |

(Continued)

OTHER PUBLICATIONS

International Search Report issued by the European Patent Office in International Application PCT/EP2014/000876.

*Primary Examiner* — Avinash A Savani
*Assistant Examiner* — Deepak A Deean
(74) *Attorney, Agent, or Firm* — Henry M. Feiereisen LLC

(57) ABSTRACT

A heating system for heating a vehicle interior of a vehicle having an internal combustion engine by using a heat exchanger includes three temperature sensors, wherein a first temperature sensor measures the coolant temperature at a coolant outlet of the internal combustion engine, a second temperature sensor measures the coolant temperature at a coolant inlet of the internal combustion engine, and a third temperature sensor measures the coolant temperature upstream of at least one heat source. A first heat circuit couples the heat exchanger to the internal combustion engine, whereas a second heat circuit bypasses the internal combustion engine. The first heat circuit operates solely with the internal combustion engine as a heat source when a target inlet temperature of the heat exchanger is above a preset value; otherwise an additional heat source is switched in, optionally operating in addition to the internal combustion engine.

2 Claims, 4 Drawing Sheets

(56) References Cited

U.S. PATENT DOCUMENTS

| | | | |
|---|---|---|---|
| 10,005,339 B2* | 6/2018 | Kakade | B60H 1/00885 |
| 2001/0035286 A1* | 11/2001 | Kobayashi | B60H 1/3207 |
| | | | 165/202 |
| 2003/0217559 A1* | 11/2003 | Ieda | B60H 1/00428 |
| | | | 62/230 |
| 2004/0050944 A1* | 3/2004 | Matsunaga | B60H 1/00385 |
| | | | 237/12.3 B |
| 2005/0178523 A1* | 8/2005 | Itoh | B60H 1/00385 |
| | | | 165/42 |
| 2006/0081355 A1 | 4/2006 | Horstmann et al. | |
| 2006/0086816 A1* | 4/2006 | Schwartz | F01P 7/167 |
| | | | 237/12.3 R |
| 2009/0283604 A1* | 11/2009 | Martinchick | B60H 1/034 |
| | | | 237/12.3 B |
| 2011/0256442 A1 | 10/2011 | Kageira et al. | |
| 2012/0145804 A1* | 6/2012 | Ishii | B60H 1/00485 |
| | | | 237/12.3 R |
| 2014/0109872 A1* | 4/2014 | Porras | F01P 7/165 |
| | | | 123/435 |
| 2014/0114515 A1* | 4/2014 | Porras | B60H 1/00385 |
| | | | 701/22 |
| 2014/0114516 A1* | 4/2014 | Badger | B60W 20/00 |
| | | | 701/22 |
| 2014/0158784 A1* | 6/2014 | Lundberg | F01P 7/14 |
| | | | 237/5 |
| 2015/0101789 A1* | 4/2015 | Enomoto | B60H 1/00485 |
| | | | 165/202 |
| 2015/0115048 A1* | 4/2015 | Brodie | B60H 1/00764 |
| | | | 237/2 B |
| 2015/0308719 A1* | 10/2015 | Gebbie | B60H 1/00921 |
| | | | 62/71 |
| 2016/0347150 A1* | 12/2016 | Kakade | B60H 1/00885 |
| 2017/0197490 A1* | 7/2017 | Enomoto | F25B 1/00 |
| 2018/0029444 A1* | 2/2018 | Porras | B60H 1/004 |

FOREIGN PATENT DOCUMENTS

| | | |
|---|---|---|
| DE | 10 2008 035 955 | 3/2010 |
| EP | 1 008 471 | 6/2000 |
| WO | WO 2010/074293 | 7/2010 |

* cited by examiner

HEATING SYSTEM AND METHOD FOR HEATING A VEHICLE INTERIOR OF A VEHICLE HAVING AN INTERNAL COMBUSTION ENGINE

CROSS-REFERENCES TO RELATED APPLICATIONS

This application is the U.S. National Stage of International Application No. PCT/EP2014/000876, filed Apr. 2, 2014, which designated the United States and has been published as International Publication No. WO 2014/166607 and which claims the priority of German Patent Application, Serial No. 10 2013 006 155.5, filed Apr. 10, 2013, pursuant to 35 U.S.C. 119(a)-(d).

BACKGROUND OF THE INVENTION

The invention relates to a heating system for heating a vehicle interior of a vehicle having an internal combustion engine. The invention also relates to a heating strategy for heating a vehicle interior by using the heating system according to the invention.

It is known that the engine heat is used for heating the vehicle cabin in vehicles having internal combustion engines that are coupled with a heat exchanger of the air conditioner of the vehicle. In hybrid vehicles, an electric drive is used in addition to the internal combustion engine, wherein the internal combustion engine and the electric drive are controlled so as to achieve the most optimal energy efficiency. However, the heat generation of the internal combustion engine is kept low as a result and the engine heat is therefore not always adequate to heat the vehicle interior, so that electric heat sources, for example a high-voltage PTC add-on heater (HV-PTC), are used.

Therefore, heating systems and heating strategies are required for hybrid vehicles that optimally use the available heat sources of the vehicle in terms of energy efficiency and electrical range of the hybrid vehicle.

A generic heating system for a vehicle with an internal combustion engine is known from DE 10 2008 035 955 A1, wherein the internal combustion engine is coupled by way of a coolant inlet and a coolant outlet with a first heat circuit having a heater for the interior of the vehicle. Furthermore, a bypass line of the first heat circuit is provided between the coolant inlet and the coolant outlet of the internal combustion engine for forming a second heat circuit. This bypass line is controlled by a bypass valve and has an electrically or exhaust-gas-heated heat source and a temperature sensor, wherein the heat source and the associated temperature sensor can also be arranged in the first heat circuit in the flow direction upstream of the heater provided for the interior. When a certain temperature is detected at a temperature sensor disposed at the coolant outlet of the engine, an inlet valve at the coolant inlet of the internal combustion engine is opened such that coolant passes through both the internal combustion engine and through the bypass line. This bypass valve is not closed until a thermostat opens a coolant circuit to a vehicle cooler, since otherwise the heat supplied via the additional heat source would be discharged via the coolant circuit to the vehicle cooler. When the internal combustion engine is started, the coolant is fed directly through the bypass line and the additional heat source to the heater for the interior, when the bypass valve is open and inlet valve at the coolant inlet of the internal combustion engine is closed.

Thus, coolant will not flow through the heater during a cold start of the engine, while at the same time the coolant is heated by the heat source.

An obvious disadvantage of this known heating system is that the highest possible energy efficiency cannot always be achieved in all operating states of travel when used in a hybrid vehicle.

SUMMARY OF THE INVENTION

With this prior art in mind, it is an object of the invention to improve a heating system of the aforementioned type so that a high energy efficiency is attained with the available heat and heat sources when used in a vehicle, in particular in a hybrid vehicle. It is another object of the invention to provide a heating strategy for heating the vehicle interior of a vehicle by using the heating system according to the invention.

The first-mentioned object is achieved by a heating system with the features of claim 1 and with the features of claim 2.

According to a first aspect of the invention, a heating system for heating of a vehicle interior of a vehicle having an internal combustion engine by means of a heat exchanger from a heater, includes
- a first heater circuit coupling the heat exchanger with the internal combustion engine and having a coolant flowing therethrough,
- a bypass line of the first heat circuit bypassing the internal combustion engine with a bypass valve to form a second heat circuit,
- at least one heat source arranged in flow direction of the coolant downstream of the bypass line, and
- a first temperature sensor for measuring the coolant temperature at a coolant outlet of the internal combustion engine, is characterized according to the invention in that
- a second temperature sensor for measuring the coolant temperature is provided at a coolant inlet of the internal combustion engine,
- a third temperature sensor for measuring the coolant temperature in the flow direction of the coolant is provided upstream of the at least one heat source, and
- in the presence of a first condition, where the first temperature sensor detects at least one predetermined nominal inlet temperature of the heat exchanger, the first heat circuit is operated exclusively with the internal combustion engine as a heat source, and in the absence of the first condition and in the presence of a second condition where the first temperature sensor detects during the operation of the first heat circuit a coolant temperature above the coolant temperature detected with the second temperature sensor, the at least one heat source is operated as an additional heat source, or where during the operation of the second heat circuit the first temperature sensor detects a coolant temperature above the coolant temperature detected by the third temperature sensor, the first heat circuit is operated in conjunction with the at least one heat source.

According to a second aspect of the invention, a heating system includes
- a first heat circuit having a coolant flowing therethrough and coupling the heat exchanger with the internal combustion engine, a bypass line of the first heat circuit bypassing the internal combustion engine and having a bypass valve to form a second heat circuit, at least one heat source arranged downstream of the bypass line in a flow direction of the coolant, a first temperature sensor for measuring a coolant temperature at a coolant outlet of the internal combustion engine, and a second temperature sensor for measuring the coolant temperature is provided at the inlet of the bypass valve, wherein in the presence of a first condition, where the first temperature sensor detects at least one predetermined nominal inlet temperature of the heat exchanger, the first heat circuit is operated exclusively with the internal combustion engine as a heat source, and wherein in the absence of the first condition and in the presence of a second condition, where during operation the first heat circuit, the first temperature sensor detects a coolant temperature above the coolant temperature detected by the second temperature sensor, the at least one heat source is operated as an additional heat source, or where during operation of the second heat circuit, the first temperature sensor detects a coolant temperature above the coolant temperature detected by the second temperature sensor, the first heat circuit is operated in conjunction with the at least one heat source.

With such an inventive heating system in accordance with the aforementioned solutions, the energetically ideal time for switching from the first heat circuit, wherein the engine heat of the internal combustion engine is available, to the second heat circuit, wherein the internal combustion engine is bypassed by way of the bypass line, and vice versa, is ensured by using two or three coolant temperature sensors arranged at suitable locations in the heat circuit. The appropriate switching between the two heat circuits is governed by specific relations of these determined temperatures. Furthermore, the robustness of the switching behavior between these two heat circuits can be maximized by using these three temperature sensors.

The second-mentioned solution differs from the first-mentioned solution in that the second temperature sensor also takes over the function of the third temperature sensor by being arranged upstream of the bypass valve in the flow direction of the coolant so that the temperature of the coolant is measured at the appropriate location both when the first heat circuit is activated as well as when the second heat circuit is activated. This solution can thus be used when the lengths of the lines of the two heat circuits is very short so that only negligible heat losses occur.

Another advantage of the two solutions of the invention is that only a small application effort is required for realizing the heating system according to the invention, because there is no need to develop accurate characteristic diagrams for the various operating points for each combination of variants of internal combustion engines and heat exchangers.

Finally, a better heating dynamics is obtained with such an inventive heating system in accordance with the two solutions, because less coolant needs to be heated by timely switching to the second heat circuit, when the internal combustion engine can no longer serve as a heat source and is therefore bypassed by the bypass line.

When, according to one embodiment of the invention, neither the first nor the second condition is satisfied, only the second heat circuit with the at least one heat source is operated as the heat source. In this case, when both conditions are not satisfied, the internal combustion engine would be a heat sink. This approach prevents the internal combustion engine from being heated electrically with the heat source which is preferably a heat exchanger and/or a PTC resistor and/or a fossil fuel add-on heater.

A heating strategy according to the first aspect of the invention for heating of a vehicle interior of a vehicle having an internal combustion engine with a heat exchanger is implemented by using a first heater circuit coupling the heat exchanger with the internal combustion engine and having a coolant flowing therethrough, a bypass line of the first heat circuit bypassing the internal combustion engine with a bypass valve to form a second heat circuit, at least one heat source arranged in flow direction of the coolant downstream of the bypass line, wherein in the presence of a first condition, where the coolant temperature at a coolant outlet of the internal combustion engine reaches at least one predetermined nominal inlet temperature of the heat exchanger, the first heat circuit is operated exclusively with the internal combustion engine as a heat source, and in the absence of the first condition and in the presence of a second condition, where during the operation of the first heat circuit, the coolant temperature at the coolant outlet of the internal combustion engine is above the coolant temperature at a coolant inlet of the internal combustion engine, in addition the at least one heat source is operated as an additional heat source, or where during the operation of the second heat circuit, the coolant temperature at the coolant outlet of the internal combustion engine is above the coolant temperature upstream of the at least one heat source in the flow direction of the coolant, the first heat circuit and in addition the at least one heat source are operated.

A heating strategy according to the second aspect of the invention for heating of a vehicle interior of a vehicle having an internal combustion engine with a heat exchanger is implemented by operating, in the presence of a first condition where the coolant temperature at a coolant outlet of the internal combustion engine reaches at least one predetermined nominal inlet temperature of the heat exchanger, the first heat circuit exclusively with the internal combustion engine as a heat source, and in the absence of this first condition and in the presence of a second condition, where during the operation of this first heat circuit the coolant temperature at the coolant outlet of the internal combustion engine is above the coolant temperature at the inlet of the bypass valve, by operating the at least one heat source additionally as an additional heat source, or where during the operation of the second heat circuit the coolant temperature at the coolant outlet of the internal combustion engine is above the coolant temperature at the inlet of the bypass valve, by operating the first heat circuit and in addition the at least one heat source.

The advantages mentioned in connection with the heating system of the invention also apply to this heating strategy.

Advantageously, in a further development, when neither the first nor the second condition is satisfied, only the second heat circuit with the at least one heat source is operated as the sole heat source.

BRIEF DESCRIPTION OF THE DRAWING

The invention will now be described in detail with reference to an exemplary embodiment in conjunction with the appended figures, which show in.

DETAILED DESCRIPTION OF PREFERRED EMBODIMENTS

Figure 1:
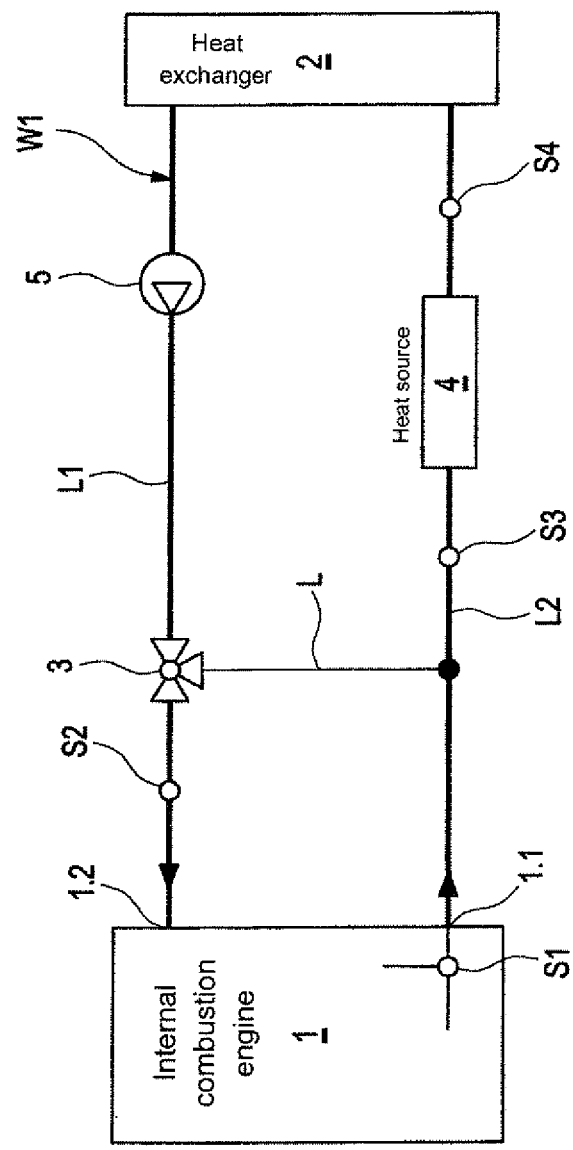
FIG. 1 a block diagram of a heating system of a vehicle as an exemplary embodiment of the invention, with a first heat circuit highlighted, FIG. 2 a block diagram of the heating system according to FIG. 1, with the second heat circuit highlighted, FIG. 3 a flow diagram of a heating strategy according to the invention performed with the heating system according to FIGS. 1 and 2, and FIG. 4 a block diagram of a heating system of a vehicle in a further exemplary embodiment of the invention.
Figure 2:
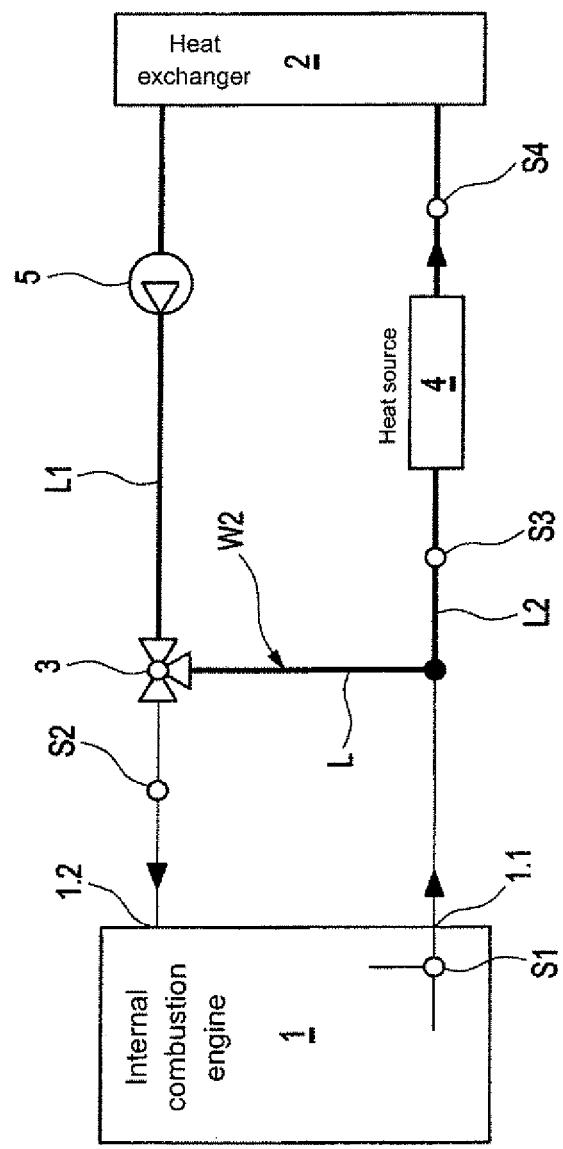

The structure of a heating system of a hybrid vehicle for heating its interior according to FIGS. 1 and 2 includes an internal combustion engine 1 as well as a heat exchanger 2, which is part of an air conditioning system of the hybrid vehicle. The internal combustion engine 1 and the heat exchanger 2 are coupled to each other via a heat circuit.

This heat circuit is composed, on the one hand, of a connecting line L1 connecting the heat exchanger 2 via an electric cooling water pump 5 and a ⅔-way valve 3 with a coolant inlet 1.2 of the internal combustion engine 1 and, on the other hand, a connecting line L2 connecting a coolant outlet 1.1 of the internal combustion engine 1 via a heat source 4 with the heat exchanger 2.

Furthermore, this heat circuit includes a bypass line L bypassing the internal combustion engine 1 which can be opened or closed by the ⅔-way valve 3 as a bypass valve. A first temperature sensor S1 is provided to measure the coolant temperature T1 at the coolant outlet 1.1 of the internal combustion engine in the direction of the heat exchanger 2.

This first temperature sensor S1 is arranged in the cooling circuit of the internal combustion engine 1 so that coolant flows around it independent of the switching state of bypass valve 3, thereby always providing a representative value for the coolant temperature.

The coolant temperature T2 at the coolant inlet 1.2 of the internal combustion engine 1 is detected with a second temperature sensor S2. A third temperature sensor S3, which is arranged downstream of the location where the inlet of the bypass line L opens into the connection line L2, measures the coolant temperature T3 in the flow direction of the coolant directly upstream of the heat source 4. Lastly, a fourth temperature sensor S4 is arranged upstream of the heat exchanger 2 in the connection line L2 for measuring the inlet temperature.

When the bypass line L is closed by this bypass valve 3, a first heat circuit W1 is formed wherein a coolant flows from the heat exchanger 2 via the cooling-water pump 5 and the bypass valve 3 into the internal combustion engine 1 and from there back into the heat exchanger 2 via the connecting line L2. This first heat circuit W1 is indicated graphically in FIG. 1 with respect to the connection lines L1 and L2 by thicker lines as compared to the bypass line L. Upon activation of this first heat circuit W1, the waste heat from the internal combustion engine 1 is used as a heat source for the heating system and thus for heating the interior of the vehicle.

Conversely, when the bypass line L is opened by the bypass valve 3, a second heat circuit W2 is formed, wherein the coolant flows back from the heat exchanger 2 via the cooling-water pump 5, the bypass valve 3, and thereafter via the bypass line L into the heat exchanger 2. This second heat circuit W2 from the connection line L1 to the bypass valve 3, the bypass line L and the remaining connecting line L2 to the heat exchanger 2 is highlighted in FIG. 2 by thick lines. Upon activation of this second heat circuit W2, only the heat source 4 is used as a heat source for heating the coolant and thus for heating the interior of the vehicle.

The heating strategy performed with the heating system in accordance with FIGS. 1 and 2 will now be explained in reference to the flow diagram of FIG. 3.

Figure 3:
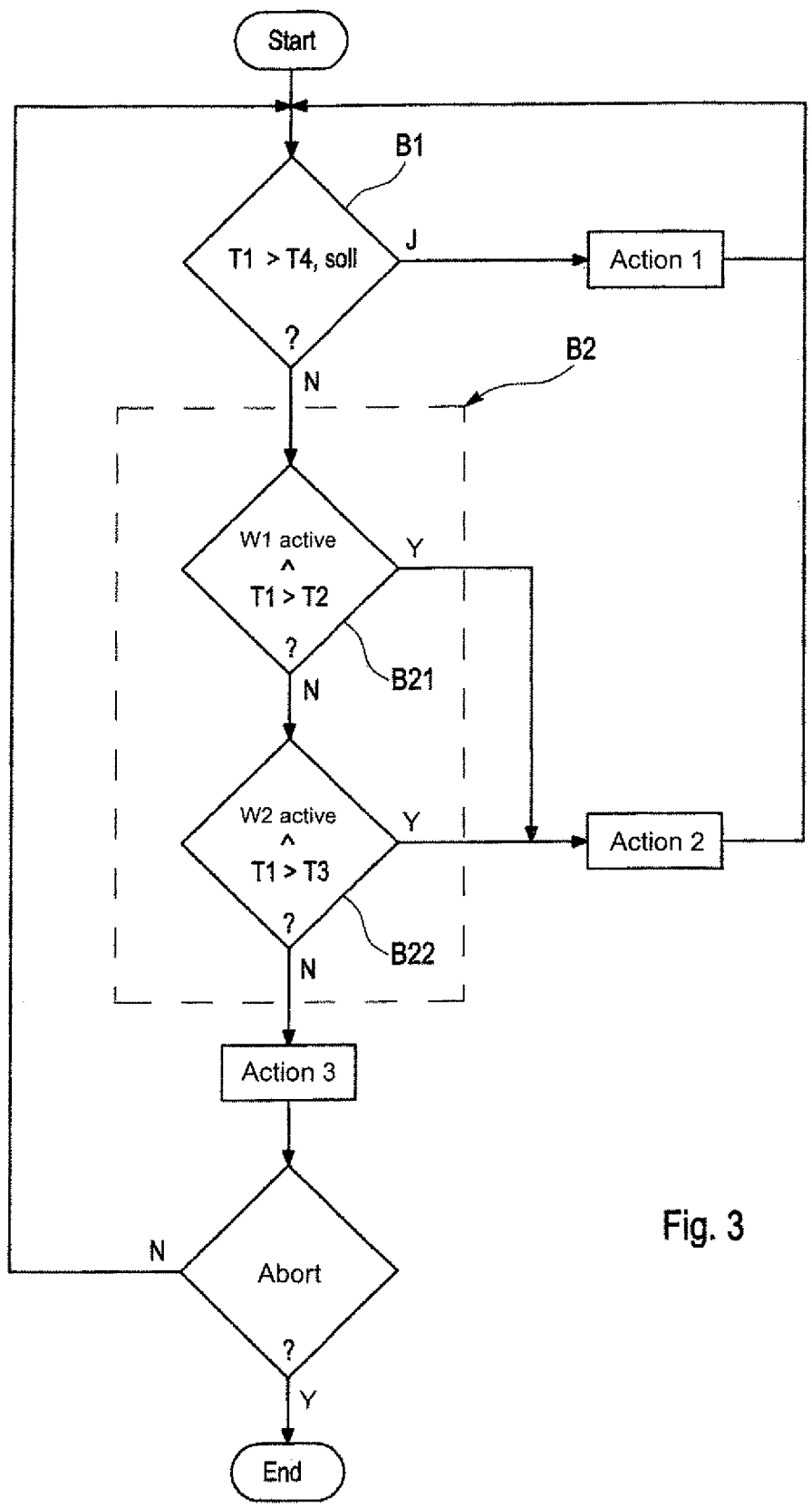

To perform this heating strategy, the temperature values of the temperature sensors S1 to S4 are cyclically interrogated in accordance with the flow diagram of FIG. 3, are compared with one another, and different actions are performed, namely one of the actions 1 to 3 in accordance with the flowchart of FIG. 3, when certain relationships between these temperatures conditions occur.

According to FIG. 3, a first condition B1 is checked after the start whether the coolant temperature T1 at the coolant outlet 1.1 of the internal combustion engine 1 is greater than a predetermined nominal inlet temperature $T_{4,soll}$ upstream of the heat exchanger 2 ($T1>T_{4,soll}$). If this first condition B1 is satisfied, then the first heat circuit W1 is activated as Action 1, i.e. the bypass valve 3 closes the bypass line L, so that only the internal combustion engine 1 then used as the sole heat source for the heat circuit and hence for heating the interior of the vehicle.

If this first condition B1 is not satisfied, the existence of a second condition B2 which has two sub-conditions B21 and B22 is checked in additional steps.

If according to the sub-condition B21, the first heat circuit W1 in accordance with FIG. 1 is activated and the coolant temperature T1 at the coolant outlet 1.1 of the internal combustion engine 1 is greater than the coolant temperature T2 at the coolant inlet 1.2 of the internal combustion engine 1 (T1>T2), the heat source 4 is activated additionally as Action 2 as an additional heat source, i.e. in addition to the internal combustion engine 1 as a heat source.

If this sub-condition B21 is not satisfied, then the second sub-condition B22 is checked. If the second heat circuit W2 according to FIG. 2 is activated in accordance with this sub-condition B22 and if the coolant temperature T1 at the coolant outlet 1.1 of the internal combustion engine 1 is greater than the coolant temperature T3 upstream of the heat source 4 (T1>T3), then a switchover to the first heat circuit W1 takes place as Action 2, so that, in addition to the heat source 4 as a heat source for the heat circuit, the internal combustion engine 1 is also used as an additional heat source for heating the interior of the vehicle.

This second condition indicates that the internal combustion engine is integrated as a heat source for heating the vehicle interior, as soon as the internal combustion engine 1 is able to do so.

If the second condition B2 is not satisfied, i.e. neither the sub-condition B21 nor the sub-condition B22 is satisfied, a switchover to and activation of the second heat circuit W2 takes place according to FIG. 3 as Action 3, so that only the heat source 4 is used as a heat source for the heat circuit. The internal combustion engine 1 is disconnected as a heat source when the bypass line L is opened by the bypass valve 3, since the internal combustion engine 1 would otherwise represent a heat sink for the heat generated by the heat source 4. This would be the case when the internal combustion engine 1 is first used as a heat source while the first heat circuit W1 is active, but subsequently cools down to a temperature where it would represent a heat sink for the coolant and would therefore be heated by the heat that is electrically generated by a heat source 4 or by a plurality of such heat sources 4. This would be contrary to an energy-efficient use of existing heat source.

If the heat source 4 were not available in the latter case, the first heat circuit W1 would be activated again, with the heating system then using only the waste heat from the internal combustion engine 1.

To ensure a robust, in particular a stable operation of the heating strategy according to the invention, the aforementioned temperature relationships are idealized and must be supplemented for their practical implementation with appropriate hysteresis and minimum dwell times in order to prevent, for example, continuous switching between the first and second heat circuit W1 and W2.

Figure 4:
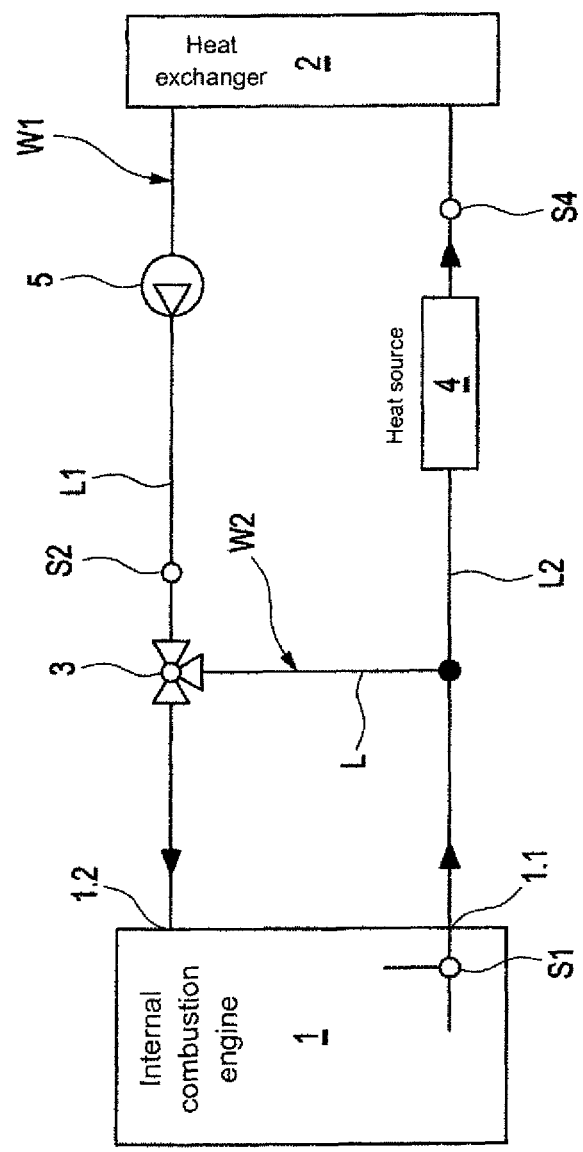

FIG. 4 shows an optional structure of a heating system according to the invention for a hybrid vehicle, which differs from that of the heating system according to FIGS. 1 and 2 in that the function of the third temperature sensor S3 is taken over by the second temperature sensor S2; however, in that case, this second temperature sensor S2 is connected in the coolant circuit in the flow direction of the cooling medium upstream of the bypass valve 3, i.e. it is located between the bypass valve 3 and the coolant pump 5. This second temperature sensor S2 is hence located in both the first heat circuit W1 and in the second heat circuit W2. This structure according to FIG. 4 can be used when the lengths of the lines are very short so that heat losses rarely occur. The associated heating strategy differs from that according to FIG. 3 only in that the temperature T2 of the second temperature sensor S2 is used in the secondary condition B22 instead of the temperature T3. The heating system in accordance with FIG. 4 has advantageously a smaller number of temperature sensors, since the third temperature sensor T3 corresponding to the heating system in accordance with FIGS. 1 and 2 is not required.

In the aforedescribed embodiments, only a single heat source 4 is used; of course, several such heat sources may also be used. PTC heaters, as for example, HV-PTCs and/or heat exchangers of the heat pumps and/or fossil heaters are suitable as a heat source.

This heating strategy according to the invention ensures the energetically ideal time for switching from the first heat circuit W1, wherein the engine heat of the internal combustion engine 1 is available, to the second heat circuit W2, wherein the internal combustion engine 1 is bypassed by the bypass line L, and vice versa, by way of three or two coolant temperature sensors S1 to S3 and S1 and S2, respectively, arranged at suitable locations in the heating system. This prevents the internal combustion engine from being heated by the heat source(s) when heating electrically. This heating strategy makes it possible to utilize the internal combustion engine as a heat source or as a heat sink by using the temperature sensors, thereby implementing, depending on the particular situation, the most efficient interconnection and optionally additional activation of the additional heat source(s) for heating the interior of the vehicle.

For example, when a particular coolant inlet temperature is required for the heat exchanger for heating the interior, this requirement is energy-efficiently fulfilled with the heating strategy according to the invention by using the "most advantageous" heat source, in this case the waste heat from the internal combustion engine. When using multiple heat sources, these are activated by taking into account the best coefficient of performance (COP).

If, for example, a hybrid vehicle is started in a cold state and is initially driven only electrically, then the interior space is heated exclusively by the additional heat sources 4, with the engine being detected as a heat sink, and the second heat circuit is activated, preventing the heated coolant from flowing via the "cold" combustion engine 1. If the engine 1 is started during the drive, for example, due to a high speed, the engine 1 becomes increasingly warmer. As soon as the internal combustion engine 1 has heated up to the point where its waste heat can contribute to heating the interior space, i.e. when the coolant temperature T1 satisfies the second condition, then the internal combustion engine 1 is integrated by way of the first heat circuit W1 so that the interior is heated by both the waste heat of the internal combustion engine and by the heat source 4 as a heat source. However, once the coolant temperature T1 has reached the inlet temperature of the heat exchanger 2 due to the increasing waste heat, which depends on the temperature setting, the additional heat source 4 or several such heat sources 4 are switched off in stages, so that only the internal combustion engine 1 as a the sole heat source takes over heating the interior space.

Only the aforementioned temperature sensors S1 to S3 or S1 and S2 are required to carry out this heating strategy, independent of the engine variants and air conditioning equipment variants. The energy balance of the internal combustion engine and the heat exchanger are measured exclusively with the temperature sensors S1 to S3, thus obviating the need for specific thermal models of the internal combustion engine and heat exchanger in a corresponding application software.

The application costs are low, because accurate characteristic curves for the various operating points need not be developed for each combination of variants of the internal combustion engine and heat exchanger.

The invention claimed is:

1. A method for heating a vehicle interior of a vehicle having an internal combustion engine by way of a heat exchanger, the method comprising:

connecting the heat exchanger in series with a heat source and a first port of a bypass valve, connecting a second port of the bypass valve to a coolant inlet of the internal combustion engine, connecting an outlet of the internal combustion engine to an inlet of the heat source, and connecting a third port of the bypass valve to a point between the outlet of the internal combustion engine and the inlet of the heat source to form a bypass line, forming a first heat circuit by conducting coolant flow between the first port of the bypass valve and the second port of the bypass valve, with the third port of the bypass valve and the bypass line being closed, forming a second heat circuit by conducing coolant flow between the first port of the bypass valve and the third port of the bypass valve, with the second port of the bypass valve being closed and with the coolant flow flowing through the bypass line and bypassing the internal combustion engine, a) cyclically measuring a first coolant temperature with a first temperature sensor disposed at the coolant outlet of the internal combustion engine, a second coolant temperature with a second temperature sensor disposed at the coolant inlet of the internal combustion engine, and a third coolant temperature with a third temperature sensor disposed at the inlet of the heat source, b) comparing the first coolant temperature with a predetermined target temperature, and when the first coolant temperature exceeds the predetermined target value, operating the first heat circuit exclusively with the internal combustion engine without the heat source and returning to step a);

c) comparing the first coolant temperature with the second coolant temperature, and when the first coolant temperature exceeds the second coolant temperature and the bypass line is closed, operating the heat source in addition to the internal combustion engine and returning to step a);
d) comparing the first coolant temperature with the third coolant temperature, and when the first coolant temperature exceeds the third coolant temperature and the bypass line is open, operating the first heat circuit in conjunction with the heat source, and returning to step a).

2. The method of claim 1, wherein when the first coolant temperature is less than the predetermined target value, less than the second coolant temperature and less than the third coolant temperature, operating the second heat circuit solely with the heat source.

* * * * *